(12) United States Patent
Morelli

(10) Patent No.: US 8,024,992 B2
(45) Date of Patent: Sep. 27, 2011

(54) HEIGHT ADJUSTMENT DEVICE FOR SADDLES OR HANDLEBARS

(76) Inventor: Angelo Morelli, Pontenure (IT)

( * ) Notice: Subject to any disclaimer, the term of this patent is extended or adjusted under 35 U.S.C. 154(b) by 537 days.

(21) Appl. No.: 11/857,745

(22) Filed: Sep. 19, 2007

(65) Prior Publication Data

US 2008/0127770 A1   Jun. 5, 2008

(30) Foreign Application Priority Data

Dec. 1, 2006   (IT) .............................. MI2006A2322

(51) Int. Cl.
*B62K 21/16* (2006.01)
(52) U.S. Cl. ..................................................... 74/551.3
(58) Field of Classification Search ................ 74/551.1, 74/551.3, 551.8; 280/200, 263, 279, 288.4; 403/52, 60, 83, 109.1, 109.5, 315
See application file for complete search history.

(56) References Cited

U.S. PATENT DOCUMENTS

| | | | |
|---|---|---|---|
| 3,635,487 A | * | 1/1972 | Porsche et al. .................. 280/16 |
| 4,789,176 A | * | 12/1988 | Carroll ........................ 280/288.4 |
| 5,876,147 A | * | 3/1999 | Longo ........................ 403/109.5 |

FOREIGN PATENT DOCUMENTS

| | | |
|---|---|---|
| DE | 92 13 029 U1 | 1/1993 |
| DE | 42 37 864 A1 | 5/1994 |
| DE | 42 42 119 A1 | 6/1994 |
| DE | 200 02 185 U 1 | 4/2000 |
| DE | 20 2004 012689 U1 | 11/2004 |
| DE | 20 2004 020002 U1 | 5/2005 |
| DE | 10 2004 009758 A1 | 9/2005 |
| EP | 1 302 395 A2 | 4/2003 |
| EP | 1 561 678 A | 8/2005 |
| FR | 2 859 162 A1 | 3/2005 |

* cited by examiner

*Primary Examiner* — Vicky Johnson
(74) *Attorney, Agent, or Firm* — Cozen O'Connor

(57) ABSTRACT

A bicycle saddle and handlebar height adjustment device comprising a tubular element (5) provided with means (2) for its connection to said saddle (3) and presenting a portion (4) to cooperate with a support element (6, 7) for said tubular element, said support element being associated with locking means (8) for said first tubular element which maintain the tubular element (5) in a determined position relative to the support element (6, 7), in which alignment means (16) are present between said support element (6, 7) and said tubular element (5) to maintain a determined angular position between the tubular element (5) and the support element (6, 7), said locking means (8) comprising a threaded (132A) ring (132) rotatably fixed to one from among the support element (6, 7) and the tubular element (5), the other from among the support element (6, 7) and the tubular element (5) presenting a thread (5A) cooperating with the thread (132A) of said ring (132). rotation of said ring (132) causing continuous movement of one element relative to the other.

12 Claims, 7 Drawing Sheets

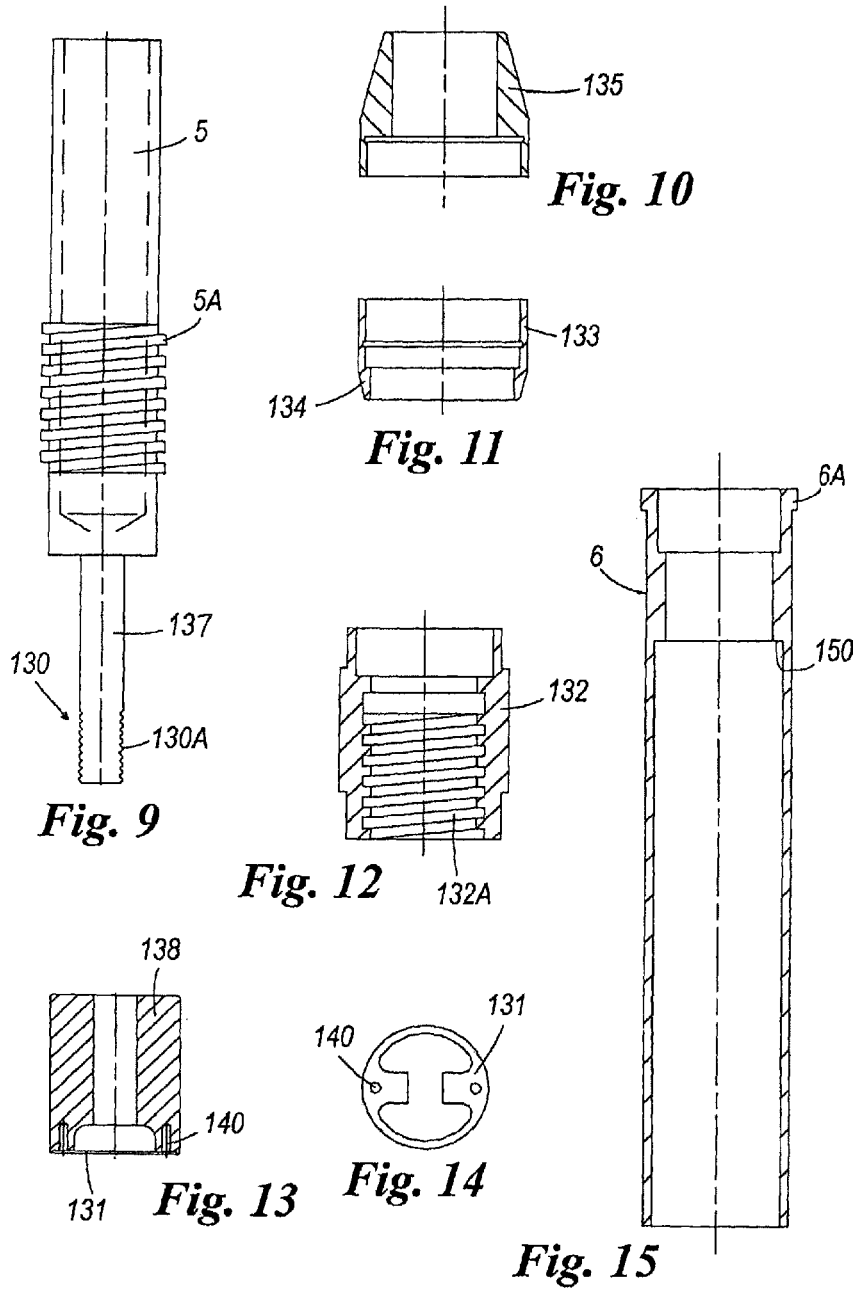
Exhibit A

HEIGHT ADJUSTMENT DEVICE FOR SADDLES OR HANDLEBARS

FIELD OF THE INVENTION

The present invention relates to a height adjustment device for bicycle saddles or handlebars in accordance with the introduction to the main claim.

BACKGROUND OF THE INVENTION

Bicycles comprise a frame into which a tubular element (tube sleeve) supporting a saddle and a tubular element supporting a handlebar are inserted. At the point at which the tubular element is inserted, the frame normally presents an axial slot, to the sides of which two projecting lugs are welded, with a screw passing between them. On tightening said screw, the frame diameter is slightly reduced to lock the tubular element at a determined height.

The height (in particular of the saddle) is usually adjusted by slackening the screw engaging the two lugs and acting on the saddle to adjust its height by forcing it to a greater or lesser extent into the frame. Having adjusted the height, the saddle is aligned with the frame by rotating the tubular element which supports it in the frame, until the correct position is achieved. The saddle is then fixed by tightening the previously slackened screw.

DISCUSSION OF THE RELATED ART

The known art presents may drawbacks.

In this respect, once the screw has been slackened, the tubular element supporting the saddle tends to slide downwards within the tube and the position at which the saddle was originally fixed is lost.

Moreover, if a user wishes to slightly lower or raise the saddle because of lack of comfort or ineffectiveness during pedaling, the user has necessarily to stop and carry out a difficult adjustment operation requiring considerable time, repeated measurements and various tries before the required seating improvement is achieved.

This operation is also very complex because the user should mark the initial position on the tubular element and then proceed to fine saddle height adjustment. If the user is still uncomfortable after this adjustment, the operation has to be repeated after marking another initial position. All this is incompatible with current cyclist requirements, particularly during competitions. In this respect, during cycling competitions lasting several hours the cyclist may physiologically require to change the bicycle saddle height in relation to his or her physical state, the slope of the road or the particular stage of the competition itself.

Cyclists, particularly racing cyclists, are currently not in a condition to make sophisticated saddle adjustments (corrections) during a race. Adjusting the saddle would in fact require them to stop and lose considerable time, so compromising the result of the race.

The aforestated with regard to saddles is also substantially valid in relation to handlebar height adjustment.

SUMMARY AND OBJECTS OF THE INVENTION

An object of the present invention is therefore to provide a bicycle saddle or handlebar height adjustment device which enables their precise height adjustment to be effected while mounted on the bicycle without interrupting the exercise, i.e. without having to stop, in particular during competitions.

A further object of the present invention is to provide a device which enables the saddle or handlebar height to be adjusted in a simple, quick and precise manner, without having to memorize the original position of the tube sleeve.

These and further objects are attained by a bicycle saddle or handlebar height adjustment device in accordance with the technical teachings of the accompanying claims.

BRIEF DESCRIPTION OF THE DRAWINGS

Further characteristics and advantages of the invention will be apparent from the description of a preferred but non-exclusive embodiment of the bicycle saddle or handlebar height adjustment device, illustrated by way of non-limiting example in the accompanying drawings, in which:

FIGS. 9, 10, 11, 12, 13, 14, 15 each show constructional element of the device of FIG. 6;

Figure 1:
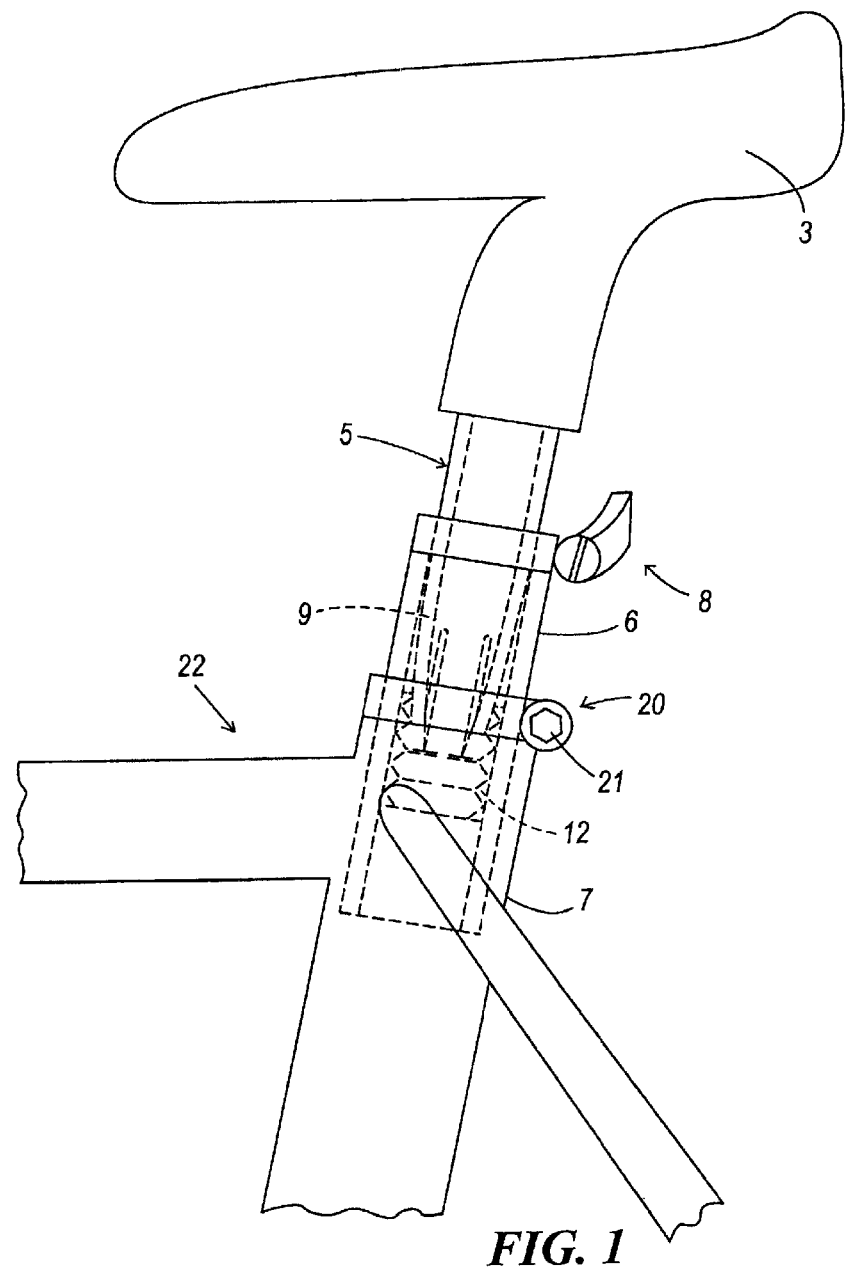
FIG. 1 is a schematic view of a bicycle part on which a device of the invention is mounted.
Figure 2:
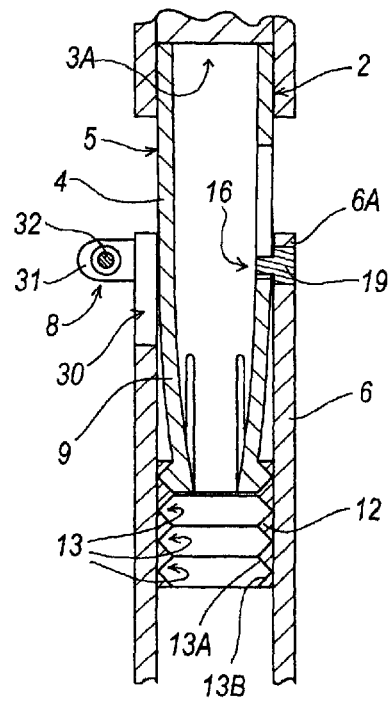
FIG. 2 is a section on the line 2-2 of FIG. 3.
Figure 3:
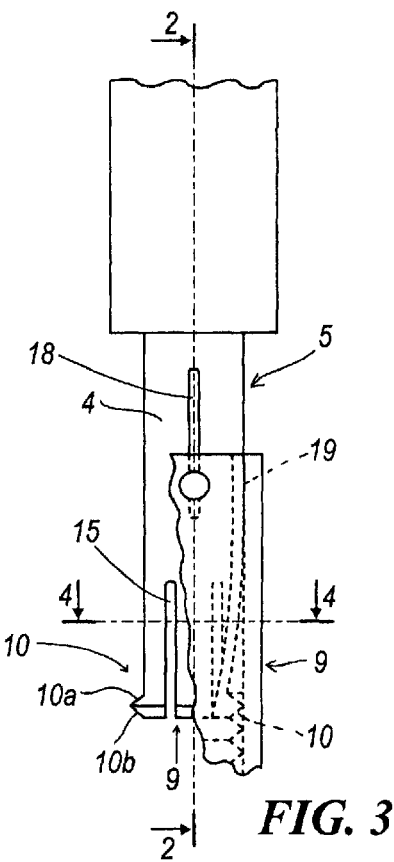
FIG. 3 is a broken front view of the device of FIG. 1.
Figure 4:
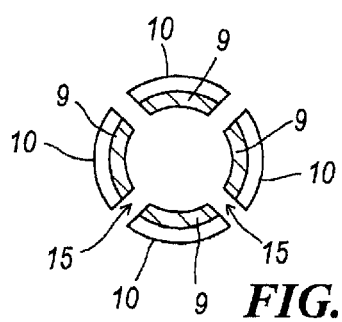
FIG. 4 is a section on the line 4-4 of FIG. 3.

Said figures show a bicycle saddle height adjustment device indicated overall by 1.

DETAILED DESCRIPTION OF THE INVENTION

The adjustment device comprises a support element which in this embodiment is a tube sleeve 6, conventionally fixed into a frame 7 of a bicycle 22. The tube sleeve 6 is locked to the frame by a locking nut 21. A portion 4 of a tubular element 5 fixed to a saddle 3 is inserted into the tube sleeve 6. More in particular a portion 2 of the tubular element 5 having forcedly penetrated into an appropriate seat 3A provided for fixing the saddle 3.

In the tubular element 5 an elongate slot 18 is provided into which a dowel 19 fixed to the tube sleeve 6 is inserted. Said dowel 19 acts as a guide to prevent the tubular element 5 from withdrawing; the dowel 19 and slot 18 also prevent the tubular element 5 from rotating relative to the tube sleeve 6 while allowing limited axial movement.

In the embodiment the tubular element 5 presents four axial grooves 15 extending from one end thereof to define four blades 9, on each of which a tooth 10 is integrally provided. Each tooth 10 presents a first and a second inclined surface 10*a*, 10*b*, the use of which will be clarified hereinafter.

Fixed into the tube sleeve 6 by an interference fit there is a bush 12 on which a plurality of axially equidistant seats 13 are provided, for example spaced apart by 3 millimetres (but this dimension can be varied at will during the device construction). The seats 13 are arranged in sawtooth manner along the circumference defined by the bush, each presenting inclined surfaces 13a, 13b.

In completing the description of the invention it should be noted that in the tube sleeve 6 a cut 30 is provided, straddled by two lugs 31 welded to the tube and between which an eccentric quick release clamp 8 is provided. The lugs and clamp act as means for locking the tubular element 5 to the tube sleeve 6. The operation of the invention is apparent from the aforegoing description and is specifically as follows. The tubular element 5 is firstly inserted into the tube sleeve 6 which is fixed to the bicycle frame 7 in conventional manner by the lugs 20 and screw 21. The slot 18 is then aligned with a hole 6A provided in the tube sleeve 6, into which the dowel 19 is forced, and which presents a T cross-section. When the tubular element 5 is inserted into the tube sleeve 6, the teeth 10 provided thereon come into contact with the bush 12, with the result that these teeth 10, following flexure of the blades 9, engage in one or more seats 13 provided in the bush 12.

The tubular element is pushed into the frame until the teeth 10 become snap-located in a seat 12 positioned approximately in the centre of the bush 12, so that an equal number of further seats 13 for tooth housing lie below and above the seat 13 in which the teeth 10 are housed. The quick release clamp 8 is then tightened. It should be noted that the size of the slot 18 is such as to limit the axial movement of the tubular element 5 so that the teeth 10 always remain in contact with the bush 12. As stated, the length of the slot determines the excursion of the tubular element 5 which effectively supports the saddle.

Before mounting the bicycle, while at rest, a user slackens the screw 21, adjusts the height of the saddle 3 to its optimal position, aligns it with the frame by rotating it into its correct position, and again tightens the screw 21. The user then mounts the bicycle and starts pedaling or begins a competition. When the user confronts a hill it is knowingly desirable for the saddle to be slightly higher than its initial position to better utilize leg leverage in order to thrust the pedals with greater force for a small number of pedal movements.

Hence without ceasing pedaling and without stopping, the user rises on the pedals so that the body weight does not act on the saddle 3, and operates the quick release lever 8. Advantageously even with the quick release device in action the saddle 3 remains in its initial position, as the teeth 10, elastically housed in the seat 13, prevent the saddle from sliding downwards.

The user then grips the saddle and pulls it upwards until the teeth 10 snap into that seat 13 above the one in which the teeth were originally inserted. This movement is advantageously made simpler by the inclined surfaces 10a, 10b of the teeth and the inclined surfaces 13a, 13b of the seats 13, which facilitate elastic flexure of the blades 9. Advantageously a metallic click indicates that blades have entered the new seat. In this case the user knows that the saddle has been raised by exactly 3 millimetres. On the basis of user experience and requirements, the user may then decide to further raise the saddle by one or more clicks or to lock its position by the lever 8.

Advantageously the saddle 3 does not lose its alignment with the frame as the slot 18 and the dowel 19 prev it from undergoing any rotation. These elements also prevent complete accidental extraction of the tubular element 5 from the tube sleeve 6.

When the user finally feels tired or wishes to lower the centre of gravity, for example to achieve better bicycle control downhill, final sprinting or fast pedaling at any moment of the competition, the user lowers the seat by acting in the foresaid manner. This operation is also useful to confront a descent or an unsurfaced road, or to achieve quicker pedaling for increased descent or level speed. Again in this case, adjustment is fine and very precise. Moreover if the user should inadvertently bear with total body weight on the saddle, this can only descend by the distance permitted by the dowel 19 and slot 18. The user hence does not lose balance, making the system very safe.

A further advantage of this device is that it makes the bicycle more easily interchangeable. In this respect, during a cycle race the bicycles of team members can suffer various problems. With a device of the present invention, it is easier for a rider/competitor to pass the bicycle to a companion who, during the race and without losing time, can properly adapt the saddle to personal requirements, without having to stop and await the aid of mechanics following the race on board support vehicles, who would then have to carry out all these adjustment operations.

A device of this kind is also very useful for adjusting the position of the cyclist on the saddle. In this respect, as the tube sleeve 6 is inclined, adjusting the saddle height brings the user closer to the handlebar (on lowering the saddle) or further from the handlebar (on raising the saddle), to hence always achieve perfect seating on the saddle and avoid the need to shift the seating point on the saddle to obtain the same effects.

The described inventive concept can also be applied to handlebar height adjustment or in all those cases in which height and/or translational adjustments are made by graduated sliding of a male tube within a female tube.

In particular, handlebar height adjustment during a competition can be useful for improving the aerodynamic effect, for lowering the bicycle centre of gravity, for improving bicycle control or simply for relieving a user's back.

The bush 12 may be inserted directly into the frame 7 and provided with the teeth 13 to act as the support element, the tubular element 5 or bicycle saddle support being inserted directly into the bicycle frame (head tube). In this case, the bush 12 would be very long and present numerous seats 13 to obtain ample saddle excursion. The slot 18 would also be provided in this case, cooperating with an extractable dowel directly inserted into the frame 7. In this case the bolt 21 could be replaced by a quick release coupling.

Again in this case the advantages of the first described embodiment would be obtained, however its use would be more suitable for non-competition bicycles.

In all the aforedescribed adjustment devices the bush 12 can be eliminated and the seats 13, possibly simply of notch shape, can be provided directly in the tube sleeve 6 or frame 7.

Figure 5:
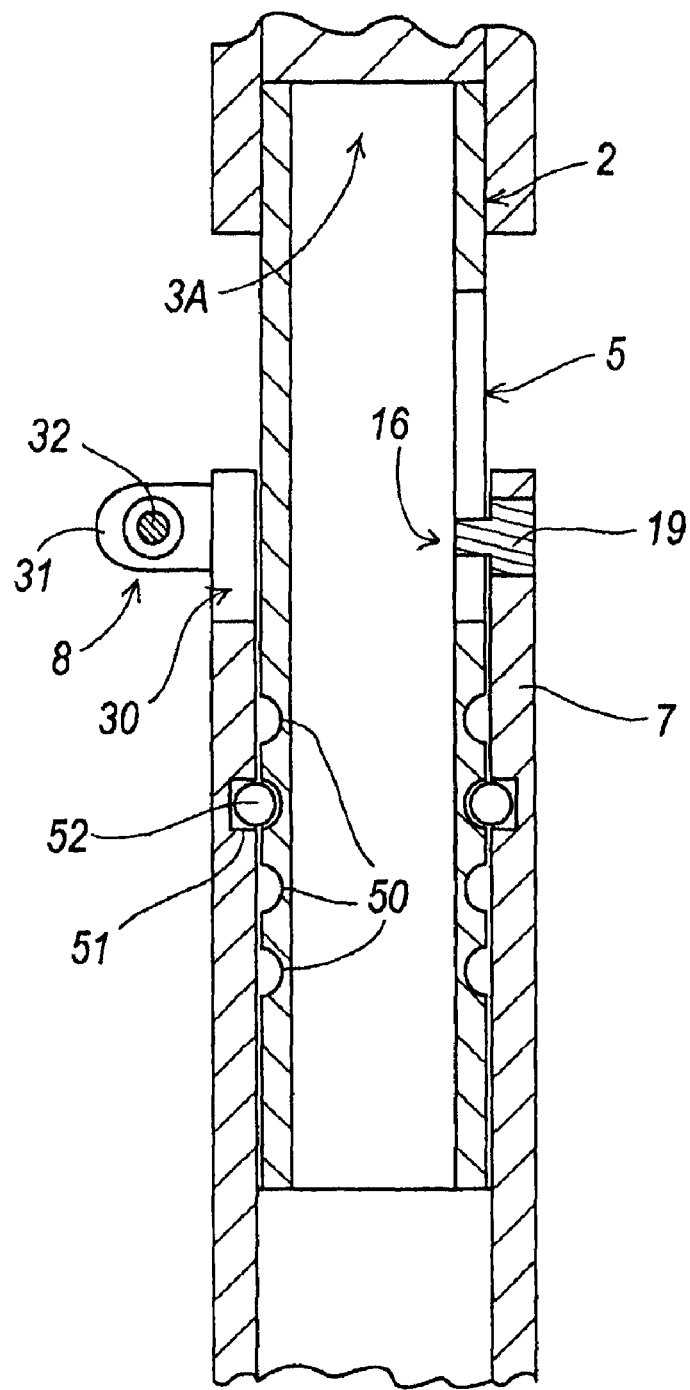
FIG. 5 is a section through an alternative embodiment of the present invention.

In a further embodiment, illustrated in FIG. 5 in which the same reference numerals are used to indicate parts equivalent to those already described, a plurality of seats 50 are provided in the tubular element.

A groove 51 is provided in the support element 7 (preferably the bicycle frame) to house an elastic ring 52.

Essentially the seats 50 are functionally similar to the already described seats 13, while the ring 52 has the same function as the teeth 10 and the blades 9.

The seats 50 can evidently be provided directly in the support element 7, while the groove 51 and the elastic ring 52 can be associated with the tubular element 5.

In a further embodiment the locking element 8 comprises a plurality of elastic teeth to cooperate with seats suitably provided in the tubular element 5.

In a different but preferred embodiment (shown in Figures from 6 to 15) the locking means 8 comprise a threaded ring 132 rotatably fixed to the tube sleeve 6. The tube sleeve presents a step 6A positioned on an end portion. The ring 132 presents an end onto which a first internally hollow end element 133 mounted on the tube sleeve 6 is screwed. When the ring and the end element are screwed down, the step 6A remains locked between the two elements. The end element 133 suitably presents (FIG. 11) a ledge 134 which prevents the ring/first end element unit from separating from the tube sleeve 6, but allows them to rotate relative thereto.

Figure 6:
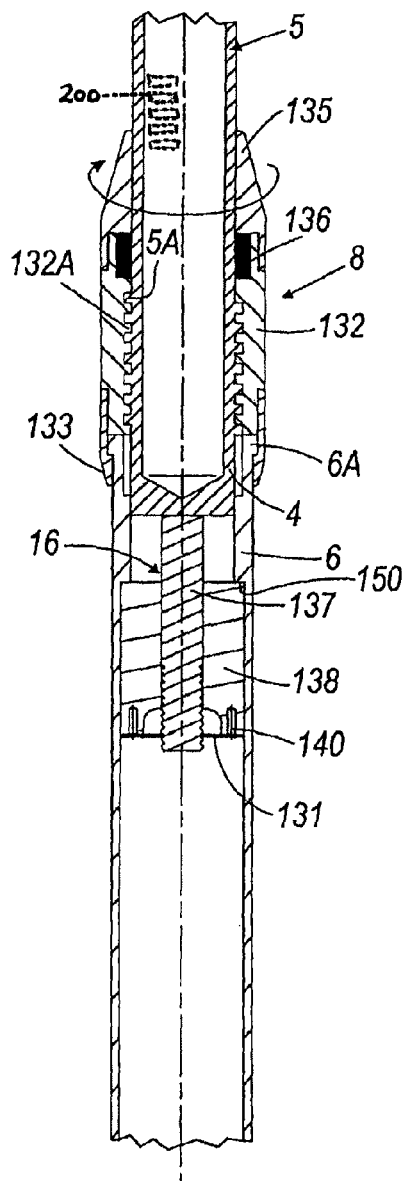
FIG. 6 is a section through a different embodiment of the invention, with a tubular element in a completely extracted position.
Figure 7:
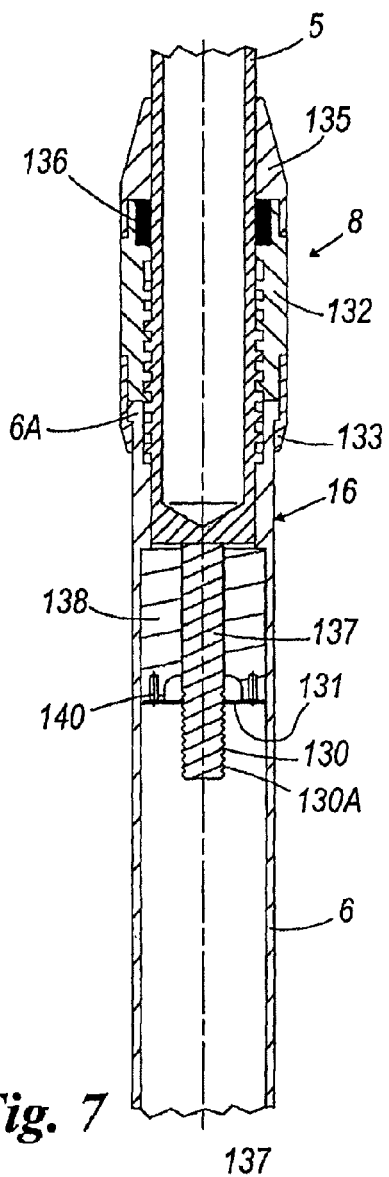
FIG. 7 is a section through the device of FIG. 6 with the tubular element in the lowered position.
Figure 8:
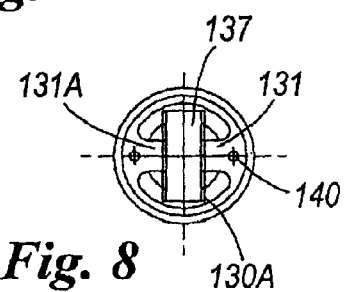
FIG. 8 is a plan view of the device of FIG. 6 from below.

The threaded ring 132 presents an internal thread 132A cooperating with a corresponding external thread 5A provided on the outer surface of the tubular element 5. As shown in FIGS. 6 and 7, the internal thread 132A terminates at a location spaced from the end of the threaded ring 132. The internal and external threads have a pitch of 2 mm/turn.

A second end element 135 mounted on the tubular element 5 is screwed on the top of the ring 132. Between the second end element and the ring a rubber element 136 is preloadedly compressed which, pressed against the surface of the tubular element 5, performs the double function of preventing entry of foreign bodies such as dust or water into the thread and of providing slight resistance to rotation of the ring 132, for stabilization and antivibration purposes.

Advantageously the first and second end element are fixed to the ring 132 by a spot of glue, which prevents it unscrewing once tightened.

An elongate portion 137 is provided at a dead end of the tubular element 5. This elongate portion 137 has a rectangular cross-section which engages in a corresponding aperture of rectangular cross-section provided in a cylindrical part 138 rigid with the tube sleeve 6. On the long faces of its rectangular section the elongate portion 137 comprises a region 130 in which sawtooth grooves 130A are provided. The cylindrical part 138 is glued to the interior of the cavity of the tube sleeve 6, abutting against a suitably provided step 150.

In the example, the sawtooth grooves 130A are spaced apart by 1.5 millimetres. The cylindrical part 138 comprises a recessed portion, perimetrally to which a spring element 131 advantageously of harmonic material is fixed. This spring element 131 presents a circular fixing part from which two elastic fingers project to engage the grooves 130A of the elongate portion 137.

The spring element is suitably fixed to the cylindrical part 138, for example by rivets 140.

Anticlockwise or clockwise discrete rotation of the ring causes the tubular element 5 to slide axially relative to the tube sleeve 6, hence adjusting the height of the saddle 3. Each time the fingers pass from one depression to the next a metallic clicking sound is emitted, unambiguously indicating to the person operating the ring that the tubular element 5, and consequently the saddle or handlebar, have changed position by a distance equal to the pitch between the depressions of the sawteeth (1.5 mm in the described example). The recessed portion of the cylindrical part 138 acts as a "resonance box" for the sound produced by the spring, which propagates into the frame and is heard with considerable intensity.

The movement of the tubular element 5 is therefore a discrete clicking movement, even though produced by a continuous screw element.

Advantageously the cooperation between the suitably inclined thread (about 2 mm per turn), the elastic element and the rubber element 136 enables the device to remain fixed in a predetermined position when the ring is not operated, even if a cyclist is seated on the saddle or if jolts are transmitted to the frame due to holes or irregularities in the road surface.

In addition, by virtue of its form fit, the elongate portion 137 of the tubular element 5 engaged in the cylindrical part 138 enables the tubular element 5 and the tube sleeve 6 to remain aligned in a predetermined angular position.

Again in this case numerous variants to the described embodiment are possible. Thus the mutual alignment means provided between the tubular element 5 and the support element (such as the tube sleeve 6 or frame 7) can assume any form; for example a grooved profile can be provided externally on the tubular element 5 below the thread. This grooved profile must cooperate with an identical grooved profile provided in the support element.

Likewise the clicking elements can be provided directly on the ring, or in other positions easily identifiable by the expert of the art. As in the preceding embodiments, the ring can be provided directly on the bicycle frame.

In that case the support element can be the bicycle frame 7 directly, in contrast to the preceding embodiments in which the tube sleeve 6 is fixed in known adjustable manner to the bicycle frame.

In a still different embodiment, the cylindrical part 138 is integral with the support element interior.

Figure 16:
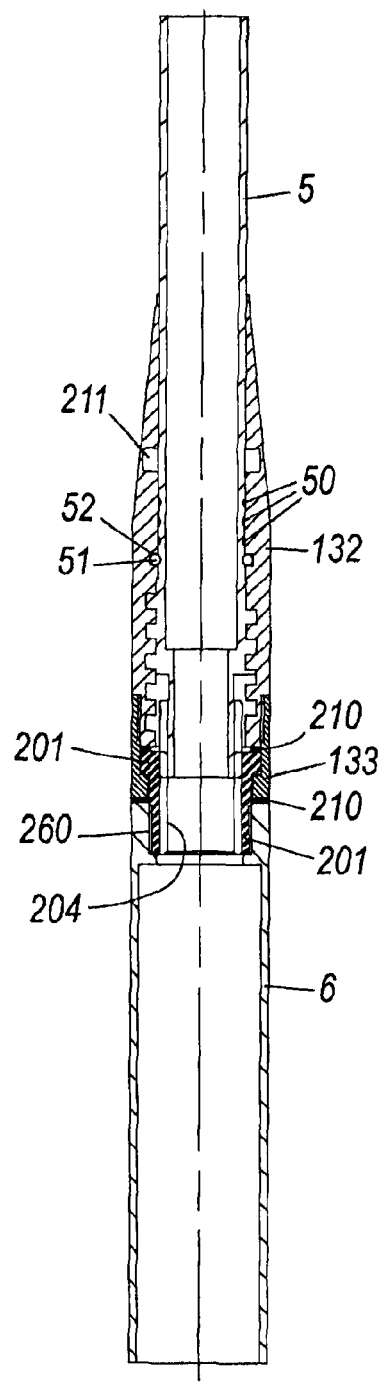
FIG. 16 shows another different embodiment of the present invention, with the tubular element completely extracted.
Figure 17:
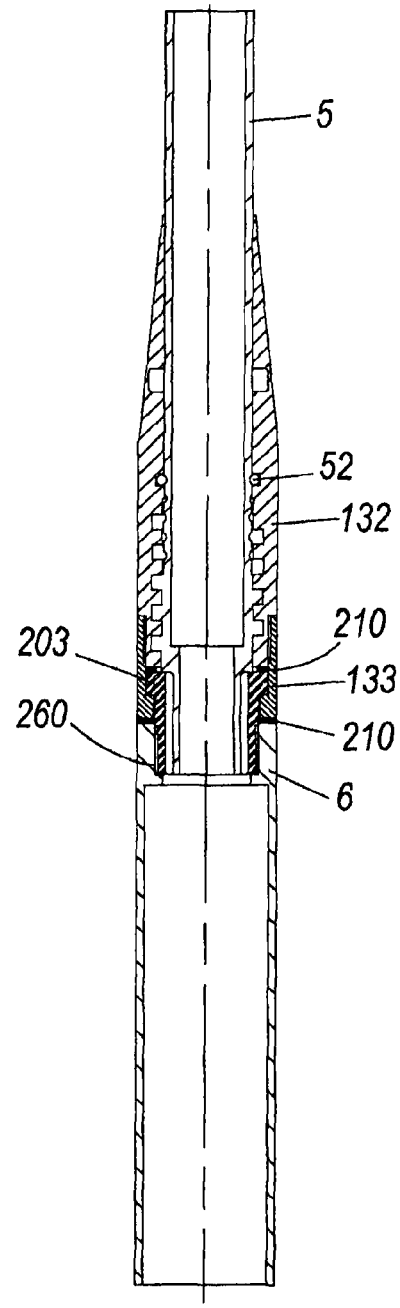
FIG. 17 is the embodiment of FIG. 16 with the tubular element in the lowered position.
Figure 18:
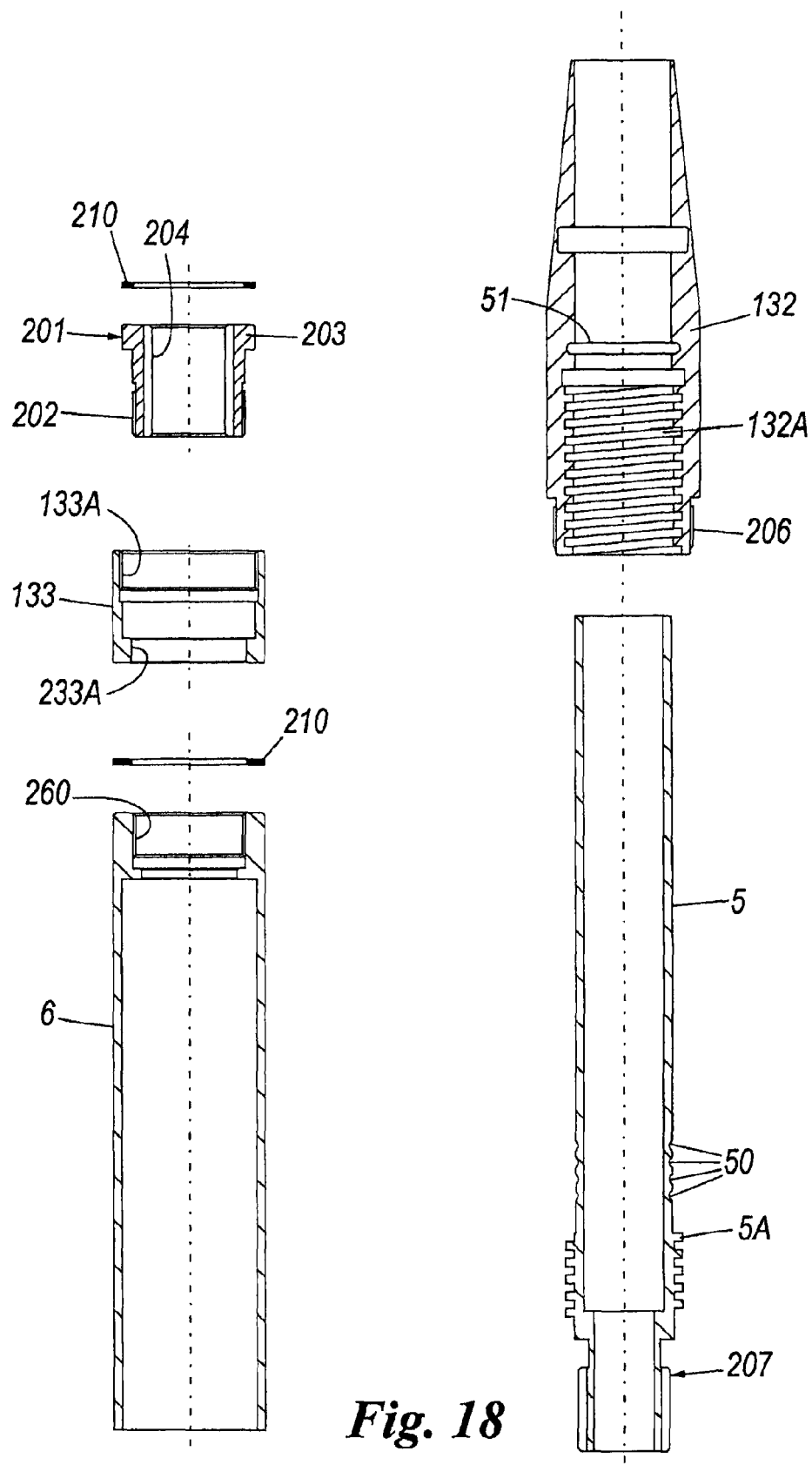
FIG. 18 is an exploded view of the device represented in FIG. 16, where all the components of the device are shown.

A further embodiment is shown in FIGS. 16-18, the description of which uses the same reference numerals as those used previously for functionally similar parts.

The support element or tube sleeve 6 of this embodiment presents at one end a threaded portion 260 to engage a threaded portion 202 of an intermediate element 201 presenting a step 203 at its top and a grooved profile 204 in its interior.

During assembly, a first internally hollow end element 133 presenting a lower rim 233A is entrapped with said rim between the support element 6 and the step 203 of the intermediate element 201. The end element 133 is thus rotatably fixed to the support element 6. The end element presents a thread 133A which cooperates with a corresponding thread 206 provided on the ring 132, for its fixing between the two elements.

The tubular element 5 presents at one end a grooved profile 207 with six teeth, cooperate with the profile 204 provided in the intermediate element 201.

During assembly, the intermediate element 201 is firstly tightened as already described. The tubular element 5 is then positioned with its grooved profile 7 inserted into the profile 204 of the intermediate element; the ring 132 is then mounted on the tubular element 5 and screwed by its thread 132A onto the thread 5A of the tubular element 5, after which the end element 133 is screwed onto the ring 132 and fixed with a spot of glue.

Advantageously, teflon spacer rings 210 are provided between the end element 133 and the support element 6 and between the intermediate element 201 and the ring 132.

A seat 211 is provided in the ring 132, facing the tubular element 5, for a gasket element (not shown but for example of rubber) for preventing entry of foreign bodies into the thread of the ring 132, and for making the rotation movement of the ring about the tubular element 5 more homogeneous.

Snap engagement means enabling the tubular element 5 to be moved discretely by rotating the ring may or may not be provided in this embodiment. For example these snap engagement means can be configured as in the preceding embodiments or, as shown, a groove 51 can be provided in the ring 132 to house an elastic element 52 cooperating with equally spaced seats provided in the tubular element 5.

It should be noted that snap engagement means are provided in the embodiment of FIGS. 16-18, but these are by no means necessary for the correct operation of the invention which, if these means are present, operates snapwise discretely, whereas if these means are absent, enables continuous adjustment of the relative position between the support element and the tubular element. Advantageously, especially in the continuous configuration, a series of coloured bands can be provided on the tubular element in a visible position, to indicate at any moment and at each rotation the mutual position of the two elements, to hence give an instantaneous indication of the height at which the saddle is positioned. For example, referring to FIG. 6, see colored bands 200 provided on the tubular element 5. Evidently, said coloured bands can be replaced by any means to visually indicate the mutual position of the two elements; such means can be for example notches, incisions, points or the like.

The invention claimed is:

1. A saddle and/or handlebar height adjustment device, comprising:
   a tubular element having one end fixed to a saddle and/or handlebar and another end coupled to a support element;
   a support element;
   a threaded ring having an internal thread, said threaded ring coupling said tubular element to said support element, said threaded ring fixed to one of said tubular element and support element so as to be rotatable, and longitudinally fixed, with respect thereto and threadedly connected to the other of said tubular element and support element so as to be longitudinally adjustable with respect thereto upon relative rotation thereof, said internal thread terminating at a location spaced from an opening of said threaded ring to which the other of the tubular element and support element is fixed; and
   alignment means provided on said tubular element and support element for maintaining the relative rotational positions of said tubular element and support element upon relative rotation of said threaded ring and said other of said tubular element and support element to which said threaded ring is threadedly connected; whereby rotation of said threaded ring relative to said tubular element and support element results in longitudinal movement of said tubular element relative to said support element but no relative rotational movement between said tubular element and said support element.

2. A device as recited in claim 1 wherein said threaded ring is fixed to said support element so as to be rotatable, and longitudinally fixed, with respect thereto; and wherein said threaded ring is threadedly connected to said tubular element so as to be longitudinally adjustable with respect thereto via relative rotation thereof.

3. A device as claimed in claim 2, wherein said ring is rotatably fixed to said support element by a first end element screwed onto the ring and cooperating with a step on said support element.

4. A device as claimed in claim 3, wherein said step is provided in an intermediate element fixed to the support element, said intermediate element also presenting a grooved profile.

5. A device as claimed in claim 1, wherein said ring presents a second end element to preload a rubber gasket element.

6. A device as claimed in claim 1, wherein said support element is a tube sleeve fixed to the bicycle frame by a fixing device, the tubular element being inserted into said support element.

7. A device as claimed in claim 1, wherein said support element is a bicycle frame into which said tubular element is directly inserted.

8. A device as claimed in claim 1, wherein means are provided on the tubular element for visually indicating the mutual position of said tubular element and said support element.

9. A device as claimed in claim 8, wherein said means for visually indicating the mutual position of said tubular element and said support element are colored bands and/or notches and/or incisions and/or points.

10. A saddle and/or handlebar height adjustment device, comprising:
    a tubular element having one end fixed to a saddle and/or handlebar and another end coupled to a support element;
    a support element;
    a threaded ring coupling said tubular element to said support element, said threaded ring fixed to one of said tubular element and support element so as to be rotatable, and longitudinally fixed, with respect thereto and threadedly connected to the other of said tubular element and support element so as to be longitudinally adjustable with respect thereto upon relative rotation thereof;
    alignment means provided on said tubular element and support element for maintaining the relative rotational positions of said tubular element and support element upon relative rotation of said threaded ring and said other of said tubular element and support element to which said threaded ring is threadedly connected; whereby rotation of said threaded ring relative to said tubular element and support element results in longitudinal movement of said tubular element relative to said support element but no relative rotational movement between, said tubular element and said support element; and
    means for providing an audible indication of the longitudinal movement of a discrete distance of said tubular element relative to said support member upon rotation of said threaded ring.

11. A device as recited in claim 10 wherein said means for providing an audible indication comprises an elongate portion provided on one of the tubular element and support element, sawtooth grooves formed along a length of said elongate portion, and a spring element connected to the other of the tubular element and support element, said spring element including an elastic finger which engages the sawtooth grooves of said elongate portion.

12. A saddle and/or handlebar height adjustment device, comprising:
    a tubular element having one end fixed to a saddle and/or handlebar and another end coupled to a support element;
    a support element;
    a threaded ring coupling said tubular element to said support element, said threaded ring fixed to one of said tubular element and support element so as to be rotatable, and longitudinally fixed, with respect thereto and threadedly connected to the other of said tubular element and support element so as to be longitudinally adjustable with respect thereto upon relative rotation thereof;
    alignment means provided on said tubular element and support element for maintaining the relative rotational positions of said tubular element and support element upon relative rotation of said threaded ring and said other of said tubular element and support element to which said threaded ring is threadedly connected; whereby rotation of said threaded ring relative to said tubular element and support element results in longitudinal movement of said tubular element relative to said support element but no relative rotational movement between said tubular element and said support element; said alignment means includes an elongate alignment portion provided on one of the tubular element and support element and an aperture provided in the other of the tubular element and support element, said elongate portion and aperture having corresponding shapes and wherein said aperture receives said elongate portion; and wherein said elongate alignment portion is provided on said tubular element and said aperture is provided in said support element.

* * * * *